Oct. 10, 1944.    C. B. McDONALD    2,360,003
APPARATUS FOR PRODUCING SELF-LOCKING SCREWS
Filed Jan. 22, 1942

INVENTOR
Charles B. McDonald.
BY
Harness, Dickey & Pierce
ATTORNEYS.

Patented Oct. 10, 1944

2,360,003

UNITED STATES PATENT OFFICE 2,360,003

APPARATUS FOR PRODUCING SELF-LOCKING SCREWS

Charles B. McDonald, Detroit, Mich., assignor to Eaton Manufacturing Company, Cleveland, Ohio, a corporation of Ohio Application January 22, 1942, Serial No. 427,714

3 Claims. (Cl. 10—154)

This invention relates generally to thread milling and more particularly relates to apparatus for forming threads on the shank of a screw in which the threads produced comprise two separate axially spaced series of threads of the same pitch and form, but in which the lead of the thread of one series is axially offset with respect to the lead of the thread of the other series whereby said screws may be self-locking when threadably received within a nut or other internally threaded aperture.

A primary object of the present invention is to provide a novel hob construction which will automatically and simultaneously produce two axially aligned series of threads of the same pitch and form with the lead of one series of threads axially offset from the lead of the other series of threads.

Still further, the invention contemplates the provision of novel apparatus for forming the thread on self-locking screws of the generic type disclosed in the patent to Dyer, Reissue No. 20,542, particularly relating to screws of such size and form that it is impracticable to produce the threads thereon by a rolling operation.

Many other and further objects, advantages, and features of the present invention will become apparent from the following specification when considered in connection with the accompanying drawing.

Figures 1, 2:
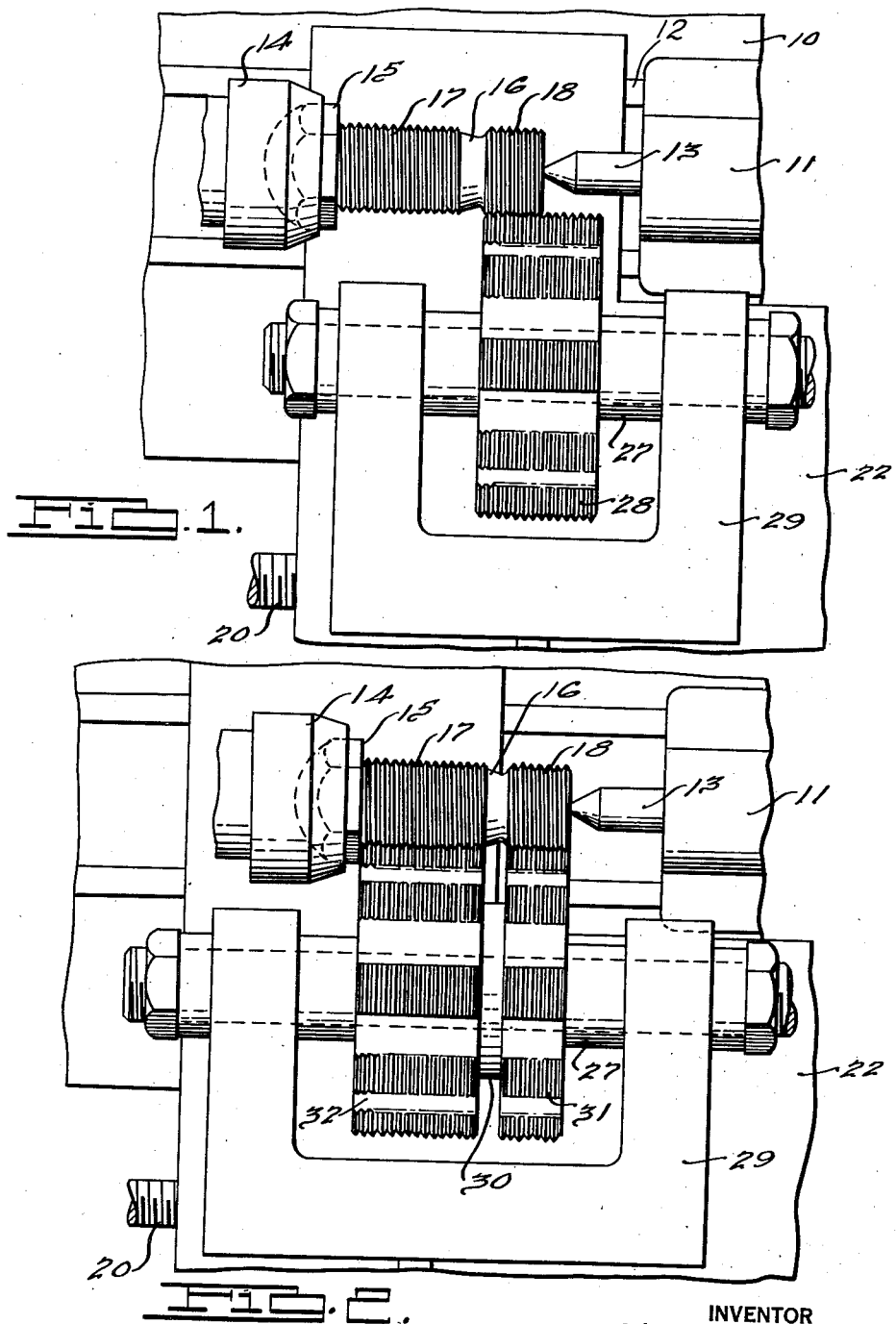
Figure 1 is a fragmentary top plan view illustrating the manner in which the final thread cutting operation is performed.
Figure 2 is a fragmentary top plan view similar to Figure 1 illustrating a novel hob construction suitable for cutting threads of the form desired, in which both portions of the shank of the screw may be threaded simultaneously with the precisely predetermined axial offset between the respective threads thereof.

With more particular reference to the drawing, the conventional construction of the thread milling machine need not be described in detail inasmuch as this machine is in most respects of standard construction.

The machine includes a bed 10 on which a tailstock 11 is adjustably mounted in suitable ways 12. This tailstock includes a dead center 13, adjustable in the tailstock in a conventional manner. The machine includes a live center comprising a chuck 14 adapted to receive the head 15 of a screw 16 on which the threads are to be formed.

The shank of the screw comprises two axially spaced portions 17 and 18, separated by a tapered portion 16 of reduced diameter. While it forms no part of the present invention, it will be readily understood by reference to the Dyer reissue patent referred to above, that after the threading operation has been completed, the screw may be provided with an axially extending, diametrically disposed slot which will permit a limited reduction in diameter of the shank portion 18 of the screw when it and the end portion 17 are threadably received in a nut or other suitable internally threaded aperture.

The screw may be conveniently mounted in the chuck 14 with its opposite axial end supported by the dead center 13 to permit rotation of the screw about its axis during the thread milling operation. The chuck 14, as is conventional in machines of this general construction, may be rotated by a suitable source of power (not shown) and, as is conventional in machines of this general category, the chuck is directly geared by a suitable gear train with a longitudinally extending feed screw 20 which serves to cause axial movement of a tool support bed mounted for longitudinal movement on suitable ways in the bed 10 of the machine. Inasmuch as the feed screw 20 is directly geared with the chuck 14, axial movement of the tool support bed will be in timed relation with respect to the rotation of the screw to be cut by the chuck 14. Obviously, the gear train and lead screw are proportioned in such a way that the axial movement of the bed and the rotation of the chuck 14 produce an axial movement of the bed equal to the pitch of the thread being cut while the chuck 14 makes one complete revolution.

Mounted on the tool support bed is a tool support table 22 transversely shiftable in suitable ways (not shown), the transverse position of which is controlled by a suitable feed screw (not shown) operated in the conventional manner.

The arbor 27 on which is mounted a thread milling hob 28 is driven at a suitable constant speed by an independent source of power not shown. The arbor 27 is journalled for rotation in a suitable yoke 29 rigidly mounted on the tool support table 22.

The thread milling hob 28 is of conventional construction, that is, the teeth run circularly therearound and have a zero helix angle. The axial length of the thread milling hob may conveniently be proportioned so that it is substantially the same as the axial length of the longer portion 17 of the screw shank on which the threads are to be cut and the pitch of the teeth in the hob, of course, corresponds to the teeth to be produced on the screw shank.

In operation of the device, a screw blank is inserted between the chuck 14 and the dead center 13 in the manner illustrated in the drawing. Rotation of the hob 28 at the desired speed is then commenced. The axial position of the tool support bed is first adjusted so that the axial position of the hob will correspond with the axial position of the screw shank on which the threads are to be cut. While the hob 28 is rotating, the tool support table 22 may be fed inwardly radially toward the screw shank 17 until the hob has cut into the proper depth. The motor driving the chuck 14 and lead screw 20 may then be started, which will cause rotation of the chuck 14 and the screw being cut, and at the same time will cause an axial feed of the hob with respect to the screw shank corresponding to the pitch of the thread being produced. When the chuck 14 has made one complete revolution, the threads on the shank portion 17 will be completely cut. The hob may then be backed away from the work and adjusted to cut the threads on the portion 18 of the screw shank.

Inasmuch as these threads must be out of phase with the threads on the portion 17, adjustment of the apparatus at this point is, therefore, necessary. The axial position of the hob may be adjusted manually in order that the threads produced on the portion 18 will have the lead thereof axially offset from the lead of the threads on the shank portion 17 the predetermined desired amount, or substantially the same results may be accomplished without changing the interconnection between the lead screw and chuck 14 by merely removing the work from the chuck and re-inserting the screw in position where it has been rotated a suitable number of degrees from the position it occupied when the first series of threads were cut. Either of these procedures is satisfactory in order to establish the desired magnitude of offset between the lead of the threads produced on the two co-axially aligned portions of the shank of the screw. After this adjustment has been made, the hob may be adjusted in the manner above described in order to mill the threads on the portion 18 of the screw shank in the manner illustrated in Figure 1 of the drawing.

Referring now to the modified form of the invention illustrated in Figure 2 of the drawing, it will be readily appreciated that the construction shown therein is identical in all respects to that shown in Figure 1, except that a novel type of hob is here employed, which hob serves to simultaneously mill the threads on both sections of the screw shank. This hob, generally designated as 30, comprises two sections 31 and 32, each having a complete series of teeth capable of milling the threads on the respective portions of the screw shank. The teeth of the hob in the sections 31 and 32 are of identical form and pitch, but these hob sections are so spaced from each other that when the hob is used to cut threads on a screw shank, the thread cut by one section of the hob will have its lead axially offset from the lead of the thread cut by the other section of the hob.

This hob may be of a unitary, integral construction, as shown, or the same may be conveniently manufactured in two separate sections in which the variation in the magnitude of the offset of the lead can easily and conveniently be controlled by inserting shims of suitable thickness between the sections of the hob when the sections are locked in position on the arbor 27.

In the operation of the apparatus employing a hob of the modified form illustrated in Figure 2 of the drawing, the screw blank may be mounted between the centers, as above described, and the axial position of the hob appropriately adjusted by movement of the tool supporting bed. The hob may then be fed into proper depth, and rotation of the chuck 14 and feed screw 20 simultaneously commenced, thereby simultaneously cutting two axially aligned series of threads on the shank of the screw with one series of threads having the lead thereof offset axially a predetermined amount with respect to the lead of the other series of threads.

While but two specific embodiments of the invention have been herein illustrated and described, it will be readily appreciated that many other and further modifications of the invention may be made without departing from the spirit and scope thereof as defined in the subjoined claims.

What is claimed is:

1. A hob for milling the thread on the shank of a self-locking screw, said hob comprising two co-axially arranged portions, each having a series of thread milling teeth thereon, the thread milling teeth of each portion being of the same form and pitch, the teeth of the threads of one portion being axially offset from the teeth of the other portion whereby to generate two co-axially arranged series of threads on said screw shank in which the thread of one series is axially offset from the thread of the other series.

2. A hob for milling the thread on the shank of a self-locking screw comprising a pair of co-axially arranged portions each including a plurality of annularly arranged thread generating teeth, the teeth on each portion having the same form and pitch with the teeth of one portion axially offset with respect to the teeth of the other portion.

3. A thread milling hob for simultaneously producing a pair of co-axially arranged threaded portions on a screw shank, said hob comprising a portion adapted to engage each portion of the screw shank to be threaded, each portion of said hob including a plurality of annular series of teeth adapted to cut threads of the same form and pitch, the teeth of one portion being axially offset with respect to the teeth of the other portion whereby the thread formed on said screw shank will have one portion thereof axially offset with respect to the thread on the other portion thereof.

CHARLES B. McDONALD.